United States Patent [19]

Nagai

[11] Patent Number: 5,638,277
[45] Date of Patent: Jun. 10, 1997

[54] SYSTEM FOR CONTROLLING A THROTTLE VALVE IN A FOLLOWING CONTROL SYSTEM FOR MOTOR VEHICLES

[75] Inventor: Masaaki Nagai, Ooizumi-machi, Japan

[73] Assignee: Fuji Jukogyo Kabushiki Kaisha, Tokyo, Japan

[21] Appl. No.: 694,837

[22] Filed: Aug. 9, 1996

Related U.S. Application Data

[63] Continuation of Ser. No. 169,314, Dec. 16, 1993, abandoned.

[30] Foreign Application Priority Data

Feb. 4, 1993 [JP] Japan ................. 5-040397

[51] Int. Cl.$^6$ ................. B60K 31/02; G06F 17/00
[52] U.S. Cl. ................. 364/426.01; 364/431.07; 348/142
[58] Field of Search ............. 364/426.01, 426.04, 364/431.07; 123/352, 361; 180/167, 169, 178, 179; 348/142, 148; 342/66

[56] References Cited

U.S. PATENT DOCUMENTS

| | | | |
|---|---|---|---|
| 4,849,892 | 7/1989 | McCombie | 364/426.04 |
| 4,879,657 | 11/1989 | Tamura et al. | 364/431.07 |
| 5,048,484 | 9/1991 | Terazawa et al. | 123/361 |
| 5,165,497 | 11/1992 | Chi | 180/169 |
| 5,166,881 | 11/1992 | Akasu | 364/426.04 |
| 5,197,562 | 3/1993 | Kakinami et al. | 180/169 |
| 5,215,159 | 6/1993 | Nishida | 180/179 |
| 5,350,034 | 9/1994 | Sato | 180/197 |
| 5,392,215 | 2/1995 | Morita | 364/426.04 |
| 5,396,426 | 3/1995 | Hibino et al. | 364/426.04 |
| 5,400,864 | 3/1995 | Winner et al. | 180/169 |
| 5,493,302 | 2/1996 | Woll et al. | 342/71 |

FOREIGN PATENT DOCUMENTS 2149738  6/1990  Japan.

Primary Examiner—Michael Zanelli
Attorney, Agent, or Firm—Martin A. Farber

[57] ABSTRACT

A throttle valve of a motor vehicle is controlled by a control unit through an actuator. The control unit determines a desired magnitude of longitudinal acceleration in accordance with running conditions of the present vehicle and the front-running vehicle, a desired throttle opening degree in accordance with the desired magnitude of longitudinal acceleration, and a control variable in accordance with the desired throttle opening degree. The actuator is operated in accordance with the variable.

9 Claims, 4 Drawing Sheets

SYSTEM FOR CONTROLLING A THROTTLE VALVE IN A FOLLOWING CONTROL SYSTEM FOR MOTOR VEHICLES

RELATED APPLICATION

This application is a continuation of my application Ser. No. 08/169,314 filed Dec. 16, 1993, now abandoned.

BACKGROUND OF THE INVENTION

The present invention relates to an automatic car following control system wherein a throttle valve is automatically controlled, and more particularly to the system for controlling the throttle valve in accordance with a desired magnitude of acceleration in a longitudinal direction of a vehicle.

In an example of the automatic following control system, a plurality of cameras are mounted on the vehicle to monitor forward conditions such as a behaviour of a front-running vehicle (a vehicle which is riding in front of a present vehicle equipped with the automatic following control system). A control unit processes image data picked up by the camera to determine acceleration and deceleration of the front-running vehicle, and drives a motor to operate the throttle valve of the present vehicle dependent on the acceleration and deceleration of the front-running vehicle. More particularly, the control unit determines a desired throttle opening degree in accordance with the detected distance between the front-running vehicle and the present vehicle, and the vehicle speed of the present vehicle. Thus, the engine power and the behaviour of the vehicle is controlled in dependency on the determined desired throttle opening degree.

Japanese Patent Application Laid-Open 2-149738 discloses a system for controlling the opening degree of the throttle valve wherein a desired throttle opening degree is calculated in accordance with a desired boost value. Namely, the throttle valve is controlled in dependency mainly on the engine power. Consequently, the vehicle is rapidly accelerated or decelerated to comply with the desired increase or decrease of the engine power. Hence, the vehicle speed abruptly changes so that the vehicle does not ride smoothly.

SUMMARY OF THE INVENTION

An object of the present invention is to provide a system for controlling a throttle valve of an automatic following control system wherein a throttle opening degree is controlled to smoothly accelerate and decelerate a vehicle.

According to the present invention there is provided a system for controlling the throttle valve of the vehicle having an automatic following control device. The automatic following control device is controlled by a control unit to electrically operate the throttle valve through an actuator. The control unit has means for determining a desired magnitude of longitudinal acceleration in accordance with running conditions of the present vehicle and the front-running vehicle, means for determining a desired throttle opening degree in accordance with the desired magnitude of longitudinal acceleration, and means for determining a manipulated variable in accordance with the desired throttle opening degree and for operating the actuator in accordance with the manipulated variable.

When automatic following is selected a desired magnitude of longitudinal acceleration is determined dependent on the distance between a front-running vehicle and the present vehicle and the difference between the speeds of the two vehicles. The desired magnitude of the longitudinal acceleration is converted into a desired throttle opening degree. The throttle valve is operated with a manipulated variable to be opened at the desired degree. The vehicle thus smoothly rides in the automatic following condition.

Other objects and features of the present invention will become understood from the following description with reference to the accompanying drawings.

DETAILED DESCRIPTION OF THE PREFERRED EMBODIMENT

Figure 1:
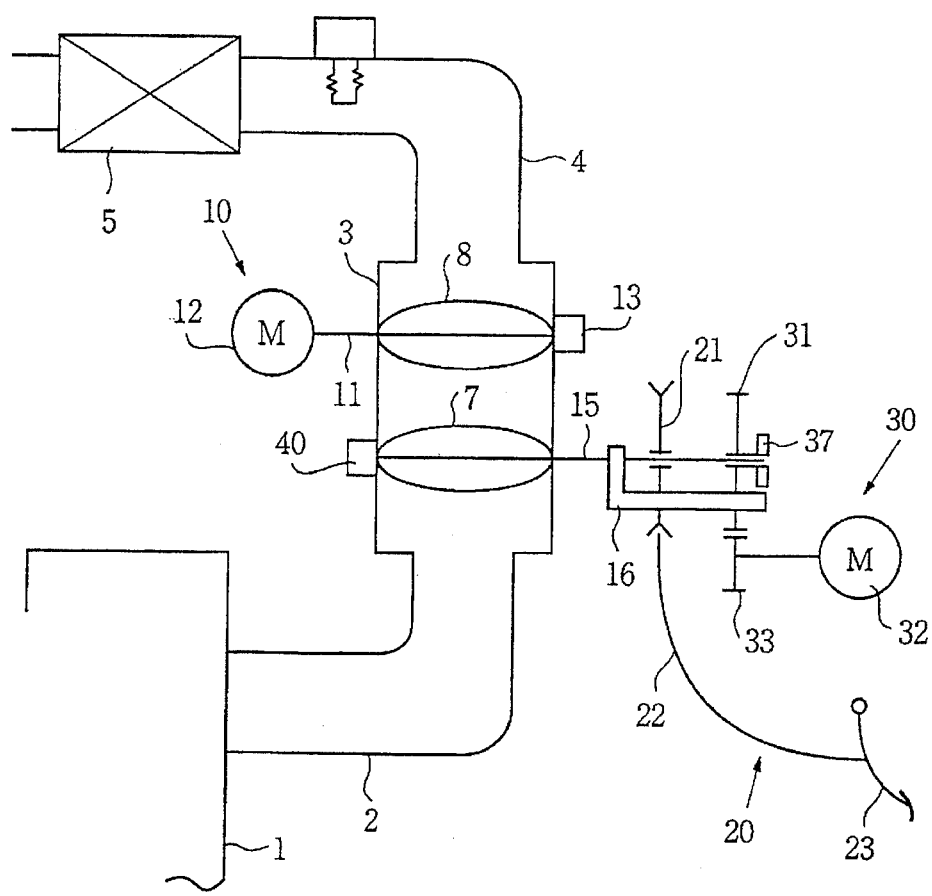
FIG. 1 shows a schematic diagram of a throttle valve and a control device thereof.

Referring to FIG. 1, an engine 1 of a motor vehicle is supplied with air through an air cleaner 5, intake pipe 4, a throttle body 3 having an auxiliary throttle valve 8 and a main throttle valve 7, and an intake manifold 2. The auxiliary throttle valve 8 is provided immediately upstream of the main valve 7 for controlling traction of the vehicle. The valve 8 is mounted on a valve shaft 11, normally at a position to be wide open and operated by a traction controller 10. The controller 10 has a motor 12 operatively connected to the valve shaft 11 for closing the valve 8.

A position sensor 13 is further provided adjacent the valve shaft 11. When the driving wheels of the vehicle slip, a traction control system is operated to drive the motor 12, thereby closing the throttle valve 8.

The main throttle valve 7 is mounted on a valve shaft 15 on which is fixedly mounted an L-shaped select lever 16. The select lever 16 is adapted to be connected either to an accelerator pedal operating device 20 or an automatic control device 30. A throttle position sensor 40 is further provided adjacent the valve shaft 15.

Figure 2:
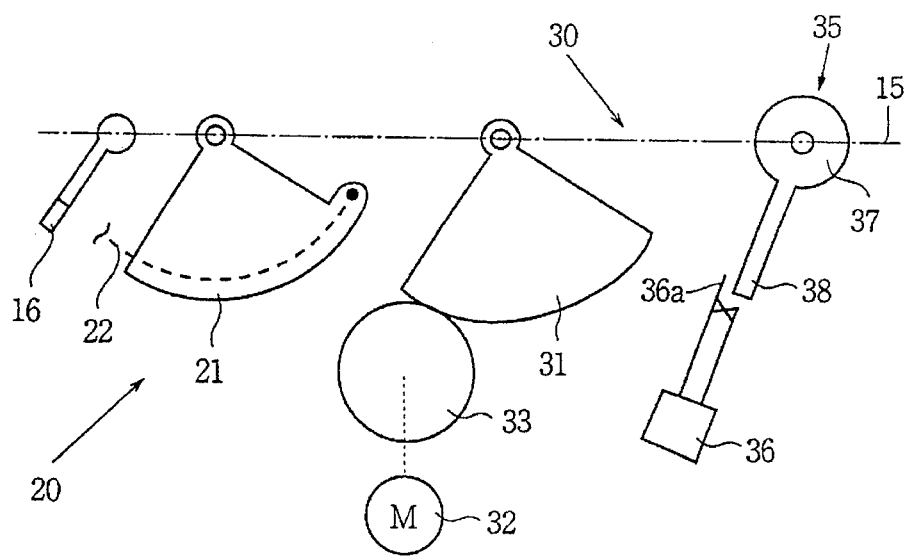
FIG. 2 shows an exploded view of the control device.

Referring to FIG. 2, the accelerator pedal operating device 20 has a sector-shaped accelerator cam 21 rotatably mounted on the shaft 15. The cam 21 is operatively connected to an accelerator pedal 23 through a cable 22.

When the accelerator pedal 23 is depressed, the cam 21 engages the select lever 16 so as to rotate the valve shaft 15. Hence the throttle valve 7 is operated.

The select lever 16 is further adapted to be engaged with a sector-shaped throttle gear 31 of the automatic control device 30. The throttle gear 31 is securely mounted on a hub of an electromagnetic clutch 37 mounted on the valve shaft 15. The throttle gear 31 engages with a pinion 33 which is driven by a motor 32.

Adjacent the electromagnetic clutch 37 is disposed a normally closed limit switch 36. The electromagnetic clutch 37 has an operation lever 38 so as to be engaged with a movable control 36a of the limit switch 36, thereby forming a limit mechanism 35. When the electromagnetic clutch 37 is energized, the operation lever 38 of the limit mechanism 35 is operatively connected to the throttle gear 31. When the motor 32 is driven, the throttle gear 31 engages with the select lever 16, thereby rotating the valve shaft 15 and hence operating the throttle valve 7. When the throttle gear 31 is rotated a predetermined degree, the operation lever 38 engages the movable contact 36a of the limit switch 36 to turn off the limit switch 36. Thus, the motor 32 is stopped.

Figure 3:
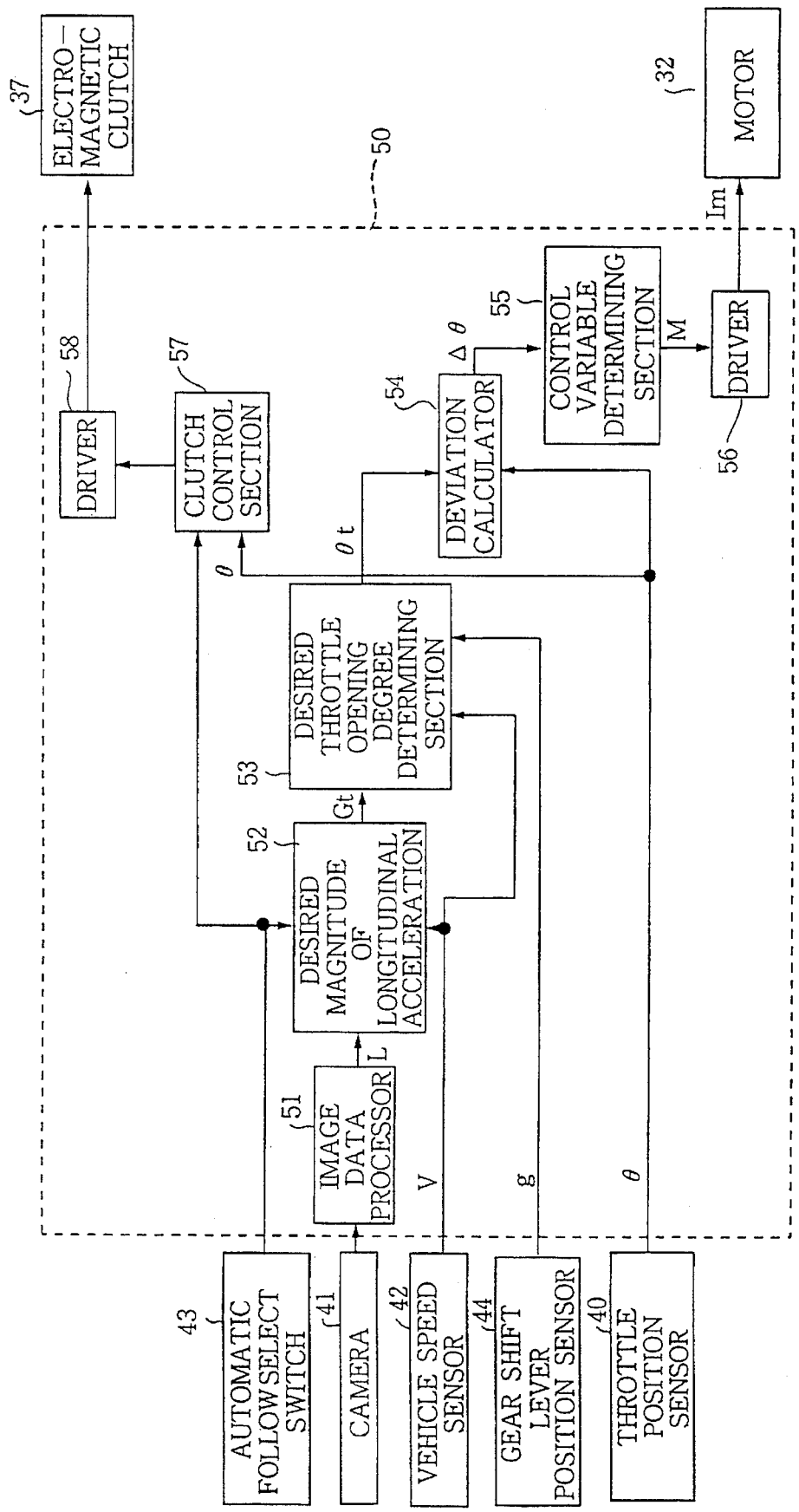
FIG. 3 shows a block diagram of a control unit of the control device.
Figure 4:
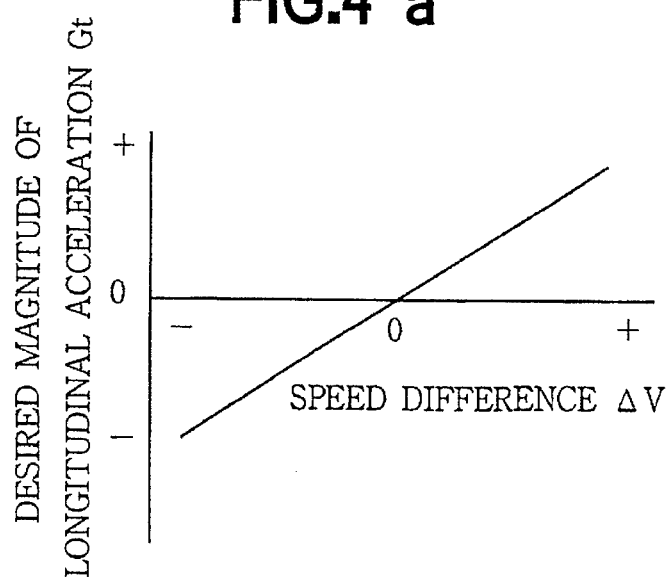
FIG. 4a is a graph showing a relationship between a desired magnitude of longitudinal acceleration and difference of speed of the front-running vehicle from the following vehicle in accordance with the present invention.
FIG. 4b is a graph showing the relationship between a desired throttle opening degree and the desired magnitude of the longitudinal acceleration at various transmission ratios.
FIG. 4c is a graph showing the relationship between vehicle speed and the desired throttle opening degree.
Figure 4:
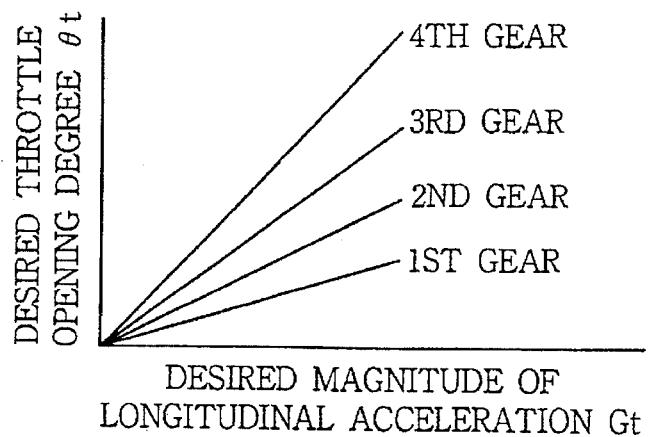
Figure 4:
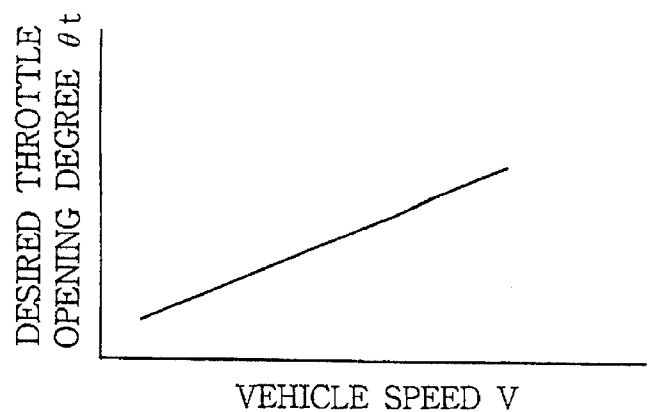

FIG. 3 shows a control unit for controlling the automatic control device 30. The control unit 50 has an image data processor 51 to which a signal from a camera 41 mounted on the vehicle is applied. The image data processor 51 detects the distance L between the front-running vehicle and the present vehicle, relative speed, and conditions of the road. The distance L is fed to a desired magnitude of longitudinal acceleration determining section 52 which is applied with an ON signal from an automatic following select switch 43 and a vehicle speed V from a vehicle speed sensor 42. The desired magnitude of longitudinal acceleration determining section 52 calculates a difference $\Delta V$ between speeds of the front-running vehicle and the present vehicle based on the distance L, and the vehicle speed V of the present vehicle. A desired magnitude of longitudinal acceleration Gt, which is a magnitude of acceleration in the longitudinal direction of the present motor vehicle, is further determined in accordance with the difference $\Delta V$ as shown in FIG. 4a. Namely, the desired magnitude of longitudinal acceleration Gt is set as an increasing function of the speed difference $\Delta V$.

The desired magnitude of longitudinal acceleration Gt is fed to a desired throttle opening degree determining section 53 to which the vehicle speed V and a transmission ratio g from a gear shift position sensor 44 for a transmission is fed to determine a desired throttle opening degree $\theta t$ as shown in the graphs of FIGS. 4b and 4c. The changing rate of the throttle valve opening degree varies dependent on the transmission ratio g as shown in FIG. 4b. More particularly, in a low speed range where the transmission ratio is large, even a small change in the opening degree causes a rapid change in acceleration or deceleration, which is disagreeable to the driver. In order to avoid this disadvantage, in the present invention, the desired throttle opening degree $\theta t$ is set smaller as the transmission ratio increases. Moreover, the desired throttle opening degree $\theta t$ is corrected to decrease with a decrease of the vehicle speed as shown in FIG. 4c.

The desired throttle opening degree $\theta t$ is applied to a deviation calculator 54 which calculates deviation $\Delta \theta$ between the desired throttle opening degree $\theta t$ and an actual throttle opening degree $\theta$ detected by the throttle position sensor 40 provided adjacent the throttle shaft 15. The deviation $\Delta \theta$ is fed to a control variable determining section 55 which calculates a weighted average of the deviations $\Delta \theta$ obtained at the present calculation and at the last calculation. A control variable M is calculated from the weighted average in accordance with the proportional-and-integral control using a proportional constant Kp and an integration constant Ki. The variable M may be obtained by the proportional-and-integral plus derivative control or the fuzzy control. The variable M is fed to a driver 56 which in turn applies an electric current Im corresponding to the variable M to the motor 32 to drive it.

The control unit 50 further has a clutch control section 57 which is applied with the output signal of the automatic following select switch 43 and the actual throttle opening degree $\theta$. When the automatic drive select switch 43 is turned on, the clutch control section 57 determines an upper limit $\theta \max$ of the throttle opening degree. When the opening degree $\theta$ of the throttle valve operated by the motor 32 reaches the upper limit $\theta \max$, a current is applied to the electromagnetic clutch 37 through a driver 58. Hence the clutch 37 is energized to couple the throttle gear 31 and the operation lever 38.

The operation of the present invention is described hereinafter. During manual driving, where the automatic following select switch 43 is turned off, when the accelerator pedal 23 is depressed, the accelerator cam 21 is rotated through the cable 22 to engage the select lever 16. As the accelerator pedal is progressively depressed, the select lever 16 is rotated by the cam 21, thereby rotating the valve shaft 15 and hence opening the throttle valve 7. Consequently, an air-fuel mixture in quantity corresponding to the opening degree of the throttle valve 7 is introduced into the engine 1, thereby producing engine power to drive the vehicle.

While the driving wheels grip the road, the auxiliary throttle valve 8 is maintained at the wide open state. When the driving wheels slip, such as at acceleration on a road having a low friction coefficient, the motor 12 of the traction controller 10 is driven to close the auxiliary throttle valve 8 dependent on the slipping quantity. Thus, the quantity of intake air is reduced to decrease the engine power. As a result, the wheels grip the road, resulting in a stable driving.

Figure 5:
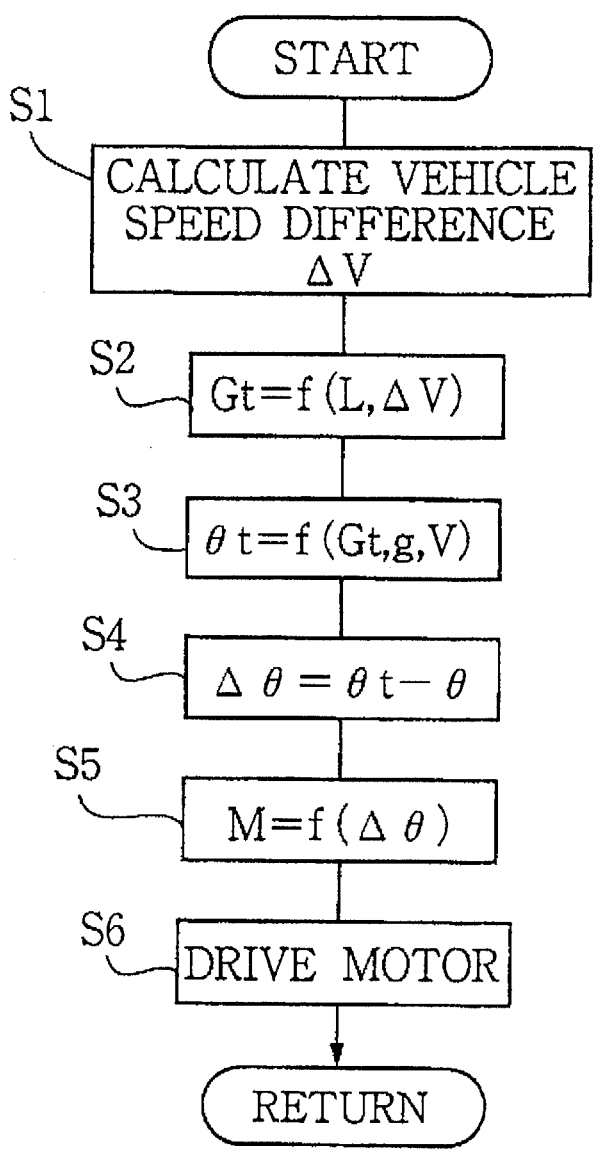
FIG. 5 is a flowchart describing the operation of the present invention.

When the driver turns on the automatic following select switch 43 while the vehicle is driven at a certain speed, and releases the accelerator pedal 23, the automatic control device 30 is operated. Namely, the image data, the vehicle speed V, the throttle opening degree $\theta$ and the transmission ratio g are detected by the camera 41, the vehicle speed sensor 42, the throttle position sensor 40 and the gear shift lever position sensor 44, respectively, and are fed to the control unit 50. Accordingly, a program shown in FIG. 5 is executed.

At a step S1, the difference $\Delta V$ between the vehicle speed of the front-running vehicle and that of the present vehicle is calculated. At a step S2, the desired magnitude of longitudinal acceleration Gt is determined in accordance with the distance L, and the speed difference $\Delta V$. Thereafter, at a step S3, the desired throttle opening degree $\theta t$ is determined in accordance with the desired magnitude of the longitudinal acceleration Gt, the transmission ratio g and the vehicle speed V. The deviation $\Delta \theta$ between the desired throttle opening degree $\theta t$ and the actual opening degree $\theta$ is calculated at a step S4, thereby to obtain the manipulated variable M of the motor 32 at a step S5. The motor 32 is driven in accordance with the manipulated variable M at a step S6. Thus, the pinion gear 33 is rotated to rotate the throttle gear 31 which engages with the select lever 16. The select lever 16 accordingly rotates the valve shaft 15 and hence opens and closes the throttle valve 7.

More particularly, when the distance L or the speed difference $\Delta V$ increases, the desired magnitude of the longitudinal acceleration Gt increases. As a result, the opening degree $\theta$ of the throttle valve 7 increases to accelerate the vehicle at the same rate as the desired magnitude of the acceleration Gt. When the distance L or the vehicle speed difference $\Delta V$ decreases, the desired magnitude of the longitudinal acceleration Gt is reduced. The opening degree is hence decreased, thereby decelerating the vehicle. Accordingly the vehicle is controlled to smoothly accelerate and decelerate. When the vehicle speed V is low, or the transmission ratio g is large, a small desired throttle opening degree $\theta t$ is determined, thereby preventing the throttle valve 7 from rapidly operating. Thus the vehicle rides smoothly despite an existence of changes in the vehicle speed and the transmission ratio.

If the opening degree θ of the throttle valve reaches the upper limit θmax, the operating lever 38 of the electromagnetic clutch 37 engages with the movable contact 36a of the limit switch 36, thereby to turn off the switch 36. The motor 32 is accordingly turned off, so that the throttle valve 7 is prevented from further opening. When the driving wheels slips, the auxiliary throttle valve 8 is operated in the same manner as at the manual driving to improve the traction.

In accordance with the present invention, when the vehicle is automatically following, the throttle opening degree is controlled in accordance with the desired magnitude of longitudinal acceleration. Hence the vehicle is smoothly driven. Moreover, the control quantity is corrected in dependency on the vehicle speed and the transmission ratio, thereby constantly providing smooth riding.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling a throttle valve of an engine in an automatic following control system for a present motor vehicle having an actuator for operating the throttle valve, a camera for detecting a running condition of a front-running vehicle and for generating a running condition signal, and a sensor for detecting a running condition of the present motor vehicle independent of engine speed and for producing a running state signal, comprising:

first determining means responsive to the running state and condition signals for determining a desired magnitude of a longitudinal acceleration in dependency on said running state and condition signals independent of engine speed;

second determining means for determining a desired throttle opening degree in accordance with the desired magnitude of the longitudinal acceleration independent of engine speed;

third determining means for providing a control variable in accordance with the desired throttle opening degree; and a driver for operating the actuator in accordance with the control variable, thereby smoothly accelerating and decelerating said present motor vehicle at any running condition.

2. The controlling system according to claim 1, wherein:

said second determining means corrects the desired throttle opening degree by vehicle speed of and transmission ratio of a transmission of the present motor vehicle.

3. The controlling system according to claim 2, wherein:

the desired throttle opening degree is set to decrease with an increase of the transmission ratio.

4. The controlling system according to claim 1, wherein:

the running state signal includes vehicle speed of the present motor vehicle, and the running condition signal includes distance between the present motor vehicle and the front-running vehicle.

5. The controlling system according to claim 4, wherein said first determining means determines the desired magnitude of the longitudinal acceleration according to a speed difference of the front-running vehicle and the present motor vehicle and to said distance.

6. The controlling system according to claim 5, wherein said first determining means calculates said speed difference from said running state and condition signals.

7. The controlling system according to claim 5, wherein said first determining means increases the desired magnitude of the longitudinal acceleration with increasing of said distance and said speed difference, respectively.

8. The controlling system according to claim 1, further comprising:

a throttle position sensor means for detecting actual opening degree of the throttle valve, and deviation calculating means for calculating a deviation between the actual opening degree of the throttle valve and the desired throttle opening degree; and said third determining means calculates said control variable from the deviation by a proportional-and-integral control.

9. The controlling system according to claim 1, wherein said sensor detects vehicle speed of the present motor vehicle.

* * * * *